United States Patent
Lee et al.

(10) Patent No.: US 8,249,661 B2
(45) Date of Patent: Aug. 21, 2012

(54) MOBILE TERMINAL

(75) Inventors: Seong-Cheol Lee, Seoul (KR);
Han-Cyu Oh, Seoul (KR); Hyo-Sung Park, Seoul (KR); Jun-Hyuck Song, Seoul (KR); Sang-Min Park, Seoul (KR); Jea-Woon Park, Seoul (KR)

(73) Assignee: LG Electronics Inc., Seoul (KR)

( * ) Notice: Subject to any disclaimer, the term of this patent is extended or adjusted under 35 U.S.C. 154(b) by 863 days.

(21) Appl. No.: 12/172,522

(22) Filed: Jul. 14, 2008

(65) Prior Publication Data

US 2009/0117944 A1 May 7, 2009

(30) Foreign Application Priority Data

Nov. 6, 2007 (KR) .......... 10-2007-0112864
Nov. 7, 2007 (KR) .......... 10-2007-0113394

(51) Int. Cl.
*H04B 1/38* (2006.01)
*H04M 1/00* (2006.01)
(52) U.S. Cl. ........ 455/566; 455/90.3; 455/575.1; 455/575.4; 379/433.06; 345/156; 345/173
(58) Field of Classification Search ........ 455/90.3, 455/566, 550.1, 575.4, 563, 575.1; 361/679.59; 345/173, 174, 156, 157; 379/433.04, 354, 379/433.06
See application file for complete search history.

(56) References Cited

U.S. PATENT DOCUMENTS

| | | | | |
|---|---|---|---|---|
| 6,069,648 A * | 5/2000 | Suso et al. | | 348/14.02 |
| 6,297,945 B1 * | 10/2001 | Yamamoto | | 361/679.04 |
| 6,332,024 B1 * | 12/2001 | Inoue et al. | | 379/433.06 |
| 6,664,951 B1 * | 12/2003 | Fujii et al. | | 345/173 |
| 6,718,182 B1 * | 4/2004 | Kung | | 455/556.1 |
| 6,892,081 B1 * | 5/2005 | Elomaa | | 455/575.1 |
| 7,333,092 B2 * | 2/2008 | Zadesky et al. | | 345/169 |
| 7,348,967 B2 * | 3/2008 | Zadesky et al. | | 345/173 |
| 7,495,659 B2 * | 2/2009 | Marriott et al. | | 345/173 |
| 7,499,040 B2 * | 3/2009 | Zadesky et al. | | 345/204 |
| 7,565,184 B2 * | 7/2009 | Lee et al. | | 455/575.1 |
| 7,663,607 B2 * | 2/2010 | Hotelling et al. | | 345/173 |
| 7,800,592 B2 * | 9/2010 | Kerr et al. | | 345/173 |
| 7,865,168 B2 * | 1/2011 | Son | | 455/343.5 |
| 2006/0097991 A1 * | 5/2006 | Hotelling et al. | | 345/173 |
| 2006/0197750 A1 | 9/2006 | Kerr et al. | | |
| 2008/0119237 A1 * | 5/2008 | Kim | | 455/566 |

FOREIGN PATENT DOCUMENTS

| | | |
|---|---|---|
| CN | 1442826 A | 9/2003 |
| CN | 2748977 Y | 12/2005 |
| JP | 8-123610 A | 5/1996 |
| JP | 10-39993 A | 2/1998 |
| JP | 2003-36132 A | 2/2003 |
| JP | 2004-38927 A | 2/2004 |
| JP | 2007-48278 A | 2/2007 |
| WO | 2006/096501 A1 | 9/2006 |

OTHER PUBLICATIONS

"Hanbook for the Palm™ Zire™ 71 Handheld," Palm Inc. (2003).

* cited by examiner

*Primary Examiner* — Marceau Milord
(74) *Attorney, Agent, or Firm* — Birch, Stewart, Kolasch & Birch, LLP

(57) ABSTRACT

A mobile terminal including a terminal body having first and second regions on a front surface thereof, a touch screen part on the first region and configured to display visual information and perform an inputting operation in a tactile manner, and a touch pad part corresponding to the second region and configured to input information corresponding to a touch applied to a pre-set position on the second region.

26 Claims, 12 Drawing Sheets

MOBILE TERMINAL

This application claims priority to Korean Application Nos. 10-2007-0112864 filed on Nov. 6, 2007, and 10-2007-0113394 filed on Nov. 7, 2007, both of which are hereby incorporated in their entirety.

BACKGROUND OF THE INVENTION

1. Field of the Invention

The present invention relates to a mobile terminal including a touch screen part and a touch key part on a front surface of the mobile terminal.

2. Discussion of the Related Art

Mobile terminals now provide many additional services besides the basic call service. For example, users can now access the Internet, watch videos and movies, listen to music, take pictures, perform scheduling tasks, etc. using their mobile terminal. Because the mobile terminal is mobile and lightweight, the user can easily carry their mobile terminals with them.

As the functions of the mobile terminal are becoming more diversified, the number of menu choices has also increased. That is, a user interface is provided in an attempt to simplify the operation of the mobile terminal. In addition, users now consider their mobile terminal to be a necessity and also think of the mobile terminal as being an extension of their personality. Thus, users are now looking for particular mobile terminals that have a design that meets their particular personality. Thus, various designs are now provided for mobile terminals.

In addition, some mobile terminals also include a touch screen that the user can touch to select particular items or menu options. However, the touch screen is small in size, and therefore it is often difficult to select the various menu options or other items displayed on the touch screen. For example, the user's input on the touch screen is not recognized or the user touches two or more menu options or items displayed on the terminal. In addition, the user often has to read a user's manual to learn how to operate the mobile terminal, because there are a large variety of options provided with the mobile terminal.

SUMMARY OF THE INVENTION

Accordingly, one object of the present invention is to address the above-noted and other problems.

Another object of the present invention is to provide a user interface environment that is easy to use and to provide a mobile terminal that has a simple design.

To achieve these and other advantages and in accordance with the purpose of the present invention, as embodied and broadly described herein, the present invention provides in one aspect a mobile terminal including a terminal body having first and second regions on a front surface thereof, a touch screen part on the first region and configured to display visual information and perform an inputting operation in a tactile manner, and a touch pad part corresponding to the second region and configured to input information corresponding to a touch applied to a pre-set position on the second region.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Figure 1:
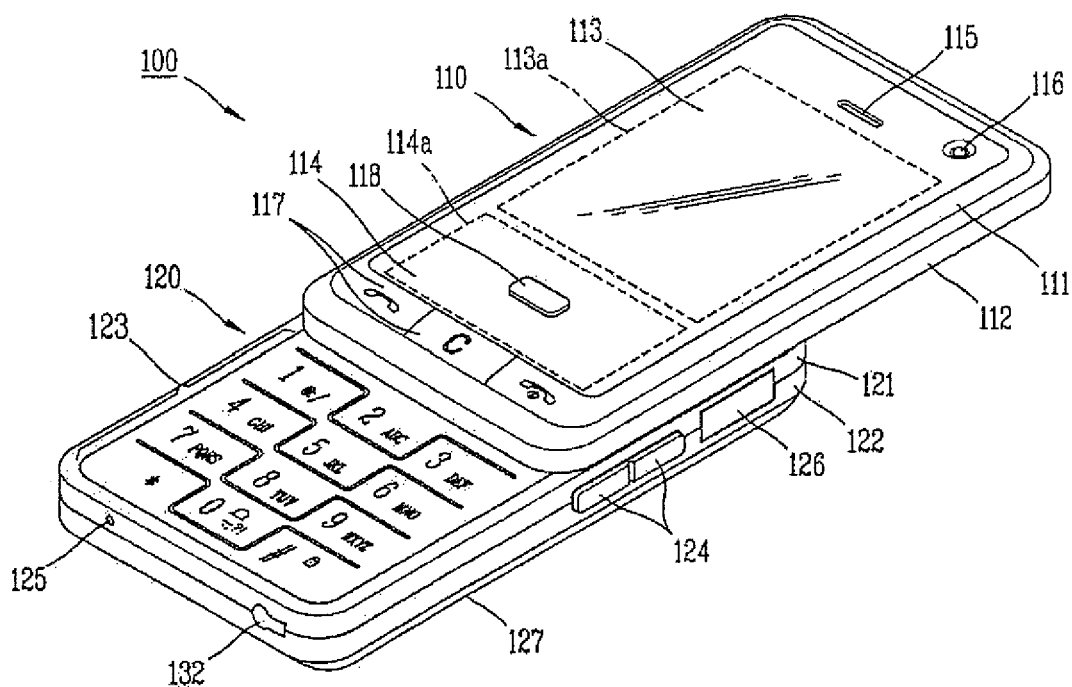
FIG. 1 is a front perspective view of a mobile terminal according to an embodiment of the present invention.

Embodiments of the present invention will now be described in detail with reference to the accompanying drawings. The same reference numerals will be used to designate the same or similar parts throughout the different figures.

FIG. 1 is a front perspective view of a mobile terminal 100 according to an embodiment of the present invention. As shown, the mobile terminal 100 includes a first body 110 and a second body 120 that is slidably moved along at least one direction with respect to the first body 110. In addition, when the first terminal body 110 overlaps the second terminal body 120, the mobile terminal 100 is in a closed configuration. When the first terminal body 110 is slid forward as shown in FIG. 1, the first body 110 exposes at least a portion of the second terminal body 120 and is an open configuration.

Further, the mobile terminal 100 is usually in a standby mode in the closed configuration, but the standby mode can be released by user manipulation. In the open configuration, the mobile terminal 100 mainly functions in a call mode or the like, but the user can also change this mode by manipulating a particular menu option or key. The mobile terminal 100 can also be automatically placed in the standby mode after the lapse of a certain time.

In addition, as shown in FIG. 1, the case (housing, casing, cover, etc.) forming the external appearance of the first terminal body 110 includes a front case 111 and a rear case 112. Various electronic components are also installed in a space formed by the front case 111 and the case 112. Further, one or more intermediate cases may also be additionally disposed between the front case 111 and the rear case 112. The case may also be formed by injection-molding a synthetic resin, or may be made of a metallic material such as stainless steel (STS), titanium (Ti), or the like.

In addition, as shown in FIG. 1, the first body 110 includes a touch screen part 113, a touch key pad part 114, an audio output unit 115, a first image input unit 116, and a first manipulating unit 117 on its front surface. The front surface of the front case 11 includes a first region 113a and a second region 114a, and the touch screen part 113 and the touch keypad part 114 are respectively formed on the first and second regions 113a and 114a.

Also, the touch screen part 113 is configured to display visual information and input information in a tactile manner, and the touch keypad part 114 is configured to input information by a touch applied to a particular position set on the second region. The audio output unit 115 may be a receiver or a speaker, and the first image input unit 116 may be a camera module for capturing an image or video. Further, the first manipulating unit 117 includes menu options that the user may select by pressing the corresponding menu option to thereby perform different functions on the terminal 100.

Further, the second body 120 includes a front case 121 and a rear case 122 that forms the second body 120. The second body 120 also includes a second manipulation unit 123 (e.g., keypad, etc.). A third manipulating unit 124, an audio input unit 125, and an interface 126 are also disposed on at least one of the front case 121 and the rear case 122.

The second and third manipulating units 123 and 124 are configured to allow a user to perform a particular option on the terminal 100. For example, the second and third manipulating units 123 and 124 may be implemented as a dome switch or a touch pad that receives a command or information according to a push or touch manipulation by the user, or may be implemented as a wheel for rotating a key, a jog type, a joystick, or the like.

In terms of function, the first manipulation unit 117 is used by the user to input a command such as start, end, scroll, etc., and the second manipulating unit 123 is used to input numbers, characters, symbols, etc. The third manipulating unit 124 may operate as a hot key for performing a particular function such as activation of the first image input unit 116. Further, the audio input unit 125 may be implemented in the form of, for example, a microphone to receive the user's voice or other sounds.

In addition, the interface 126 is configured to allow the mobile terminal 100 to exchange data with an external device. For example, the interface 126 may be implemented as one of a connection port (terminal) for connecting an ear phone to the mobile terminal via a fixed or wireless method, a port (e.g., an IrDA port), a BLUETOOTH™ port, a wireless LAN port, or a power supply port that supplies power to the mobile terminal 100, or the like. The interface 126 may also be a card socket (or receiving unit) for accommodating an external card, such as a Subscriber Identity Module (SIM), a User Identity Module (UIM), a memory card for storing information, or the like.

In addition, reference numeral 127 identifies a battery cover and reference numeral 132 identifies a broadcast receiving antenna. The reference numeral 118 in the touch key pad part 114 identifies a center key. These features will be discussed in more detail with respect to the additional figures.

Figure 2:
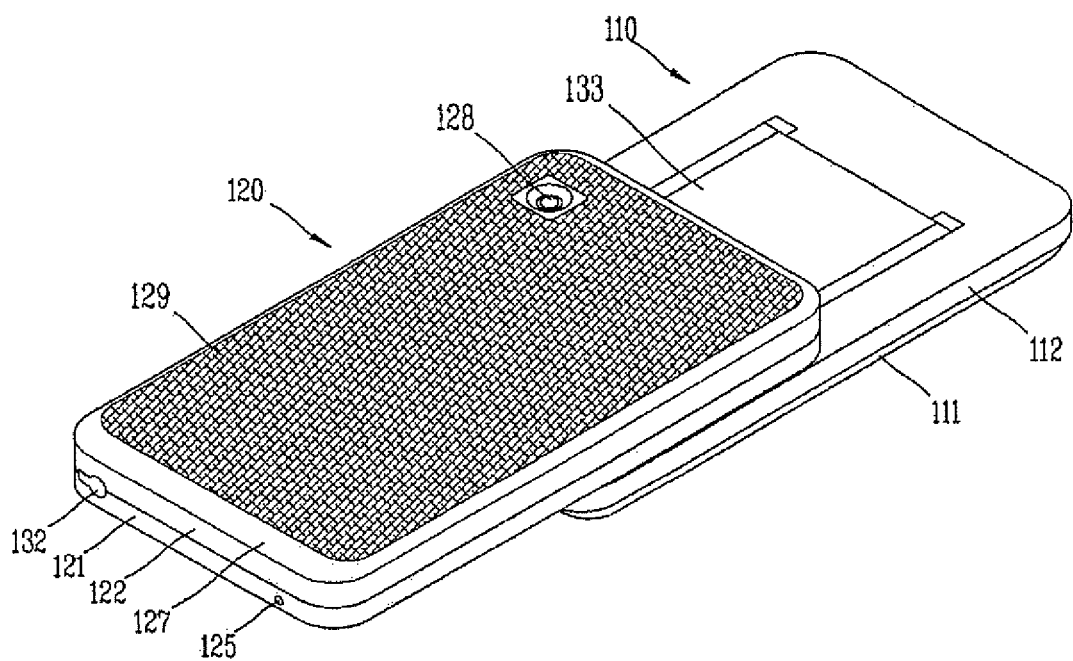
FIG. 2 is a rear perspective view of the mobile terminal according to an embodiment of the present invention.

Next, FIG. 2 is a rear perspective view of the mobile terminal according to an embodiment of the present invention. As shown in FIG. 2, the rear surface of the second body 120 includes a second image input unit 128 that has an image capture direction which is substantially opposite to that of the first image input unit 116 (See FIG. 1), and may be a camera supporting a different number of pixels from that of the first image input unit 116.

For example, the first image input unit 116 may be used for low resolution (i.e., supporting a relatively small number of pixels) to quickly capture an image (or video) of the user's face and immediately transmit the captured data to another party during a video conferencing call or the like. Meanwhile, the second image input unit 128 may be used for high resolution (i.e., supporting a relatively large number of pixels) in order to capture more detailed or higher quality images or video which typically do not need to be transmitted immediately. In addition, a flash may be additionally disposed next to the second image input unit 128 to provide extra light to a subject when an image of the subject is being captured by the second image input unit 128.

In the above description, the second image input unit 128 is disposed on the second terminal body 120, but the second image input unit 128 may be mounted on the rear case 112 of the first body 110. In this instance, the elements disposed on the rear case 112 can be protected or covered by the second terminal body 120 in the closed configuration. In addition, if the second image input unit 128 is not provided, the first image input unit 116 may be configured to rotate (or otherwise be moved) to thus allow capturing images in the direction of the second image input unit 128 as well as other directions.

Further, as shown in FIG. 2, the broadcast signal receiving antenna 132 is disposed at one side of the rear case 122. FIG. 2 illustrates the antenna 132 in a retractable state, and the antenna 132 may be retracted from the second body 120. In addition, FIG. 2 also illustrates one part of a slide module 133 that slidably combines the first body 110 and the second body 120 disposed on the rear case 112 of the first body 110. The other part of the slide module 133 is disposed on the front case 121 of the second body 120.

Further, the battery cover 127 is installed at the rear case 122 to cover a battery that supplies power to the mobile terminal 100. The battery may be detachably combined within the second body 120. Alternatively, the battery may be detachably combined in the form of a pack. Also, in the mobile terminal shown in FIG. 2, a pattern part 129 is formed on the rear surface of the battery cover 127 to prevent the mobile terminal 100 from being easily moved or from slipping of a surface. In addition, as shown in FIG. 2, the pattern part 129 has a geometrical regular pattern such as lattice or comb-like pattern. The pattern part 129 may also be formed by coating or injection-molding a resin material on a metal base or by some other appropriate method.

Figure 3:
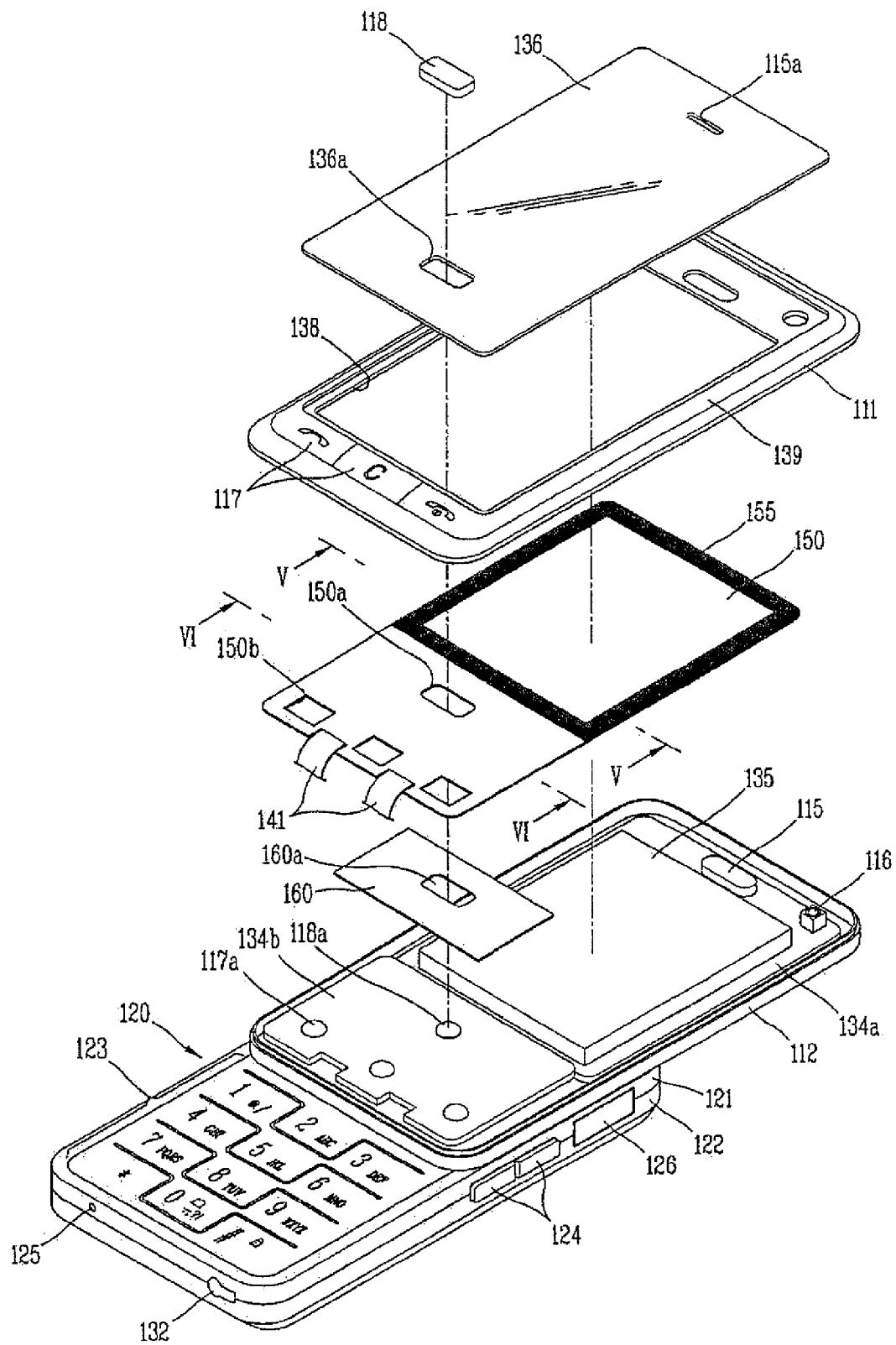
FIG. 3 is an exploded perspective view of the mobile terminal in FIGS. 1 and 2.

Next, FIG. 3 is an exploded perspective view of the mobile terminal in FIGS. 1 and 2, and will be used to explain an internal structure of the first body 110. As shown in FIG. 3, printed circuit boards (PCBs) 134a and 134b are mounted at an internal space between the front case 111 and the rear case 112, and electronic components that perform various functions of the mobile terminal 100 are mounted on the PCBs 134a and 134b.

Further, a display module 135 for displaying visual information is mounted on the PCB 134a, and may include an LCD (Liquid Crystal Display) module, an OLED (Organic Light Emitting Diode) module, or the like. A window 136 is disposed on an outer side of the display module 135 and has a transmissive region allowing the visual information displayed on the display module 135 to be seen. In addition, the window 136 may be made of a transparent material, a synthetic resin of a translucent material, or tempered glass, etc.

A through hole 136a is also formed at a portion corresponding to a second region of the window 136, and a sound hole 115a is formed at the other end of the window 136 for inputting sounds, etc. to the audio output unit 115. In addition, a window mounting part 138 is formed at the front case 111 in order to mount and support the window 136 therein. As shown in FIG. 3, the window mounting part 138 is dented from a surface of the front case 111 so as to receive the window 136.

Further, a support frame 139 is mounted at a circumference of the window mounting part 138, and may be made of a metallic material or a semitransparent synthetic resin material. The first manipulation unit 117 is formed at one region of the support frame 139, and switches 117a are mounted at the PCB 134b to input information according to a pressing operation of the first manipulating unit 117.

Also, a touch sheet 150 that senses a touch is attached at an inner side of the window 136 and may be made of a transparent material. The touch sheet 150 is also electrically connected with the PCB 134b by a flexible PCB (FPCB) 141. In addition, a through hole 150a is formed at a region corresponding to the second region 113b of the touch sheet 150, and the center key 118 is disposed in the through hole 150a so that the center key 118 can be pressed. In addition, a switch may be mounted on a rear surface of the center key 118 to input information according to a pressing operation of the center key 118. Also, mounting holes 150b are formed at one region of the touch sheet 150 to allow the first manipulating unit 117 to be mounted thereon. The touch sheet 150 also includes a shielding pattern 155 formed at edges of the touch sheet 150.

Further, an illumination sheet 160, which is surface-illuminated, is disposed at an inner side of the touch sheet 150, and is used to illuminate a region of the window 136 or indicate a certain mark on one region of the window 136. Further, the illumination sheet 160 may include an EL (Electroluminescence) sheet. The illumination sheet 160 also includes a through-hole 160a corresponding to the through-holes 150a and 136a. A dome switch 118a or other input button is also formed on the PCB 134b to correspond with the center key 118.

Figure 4:
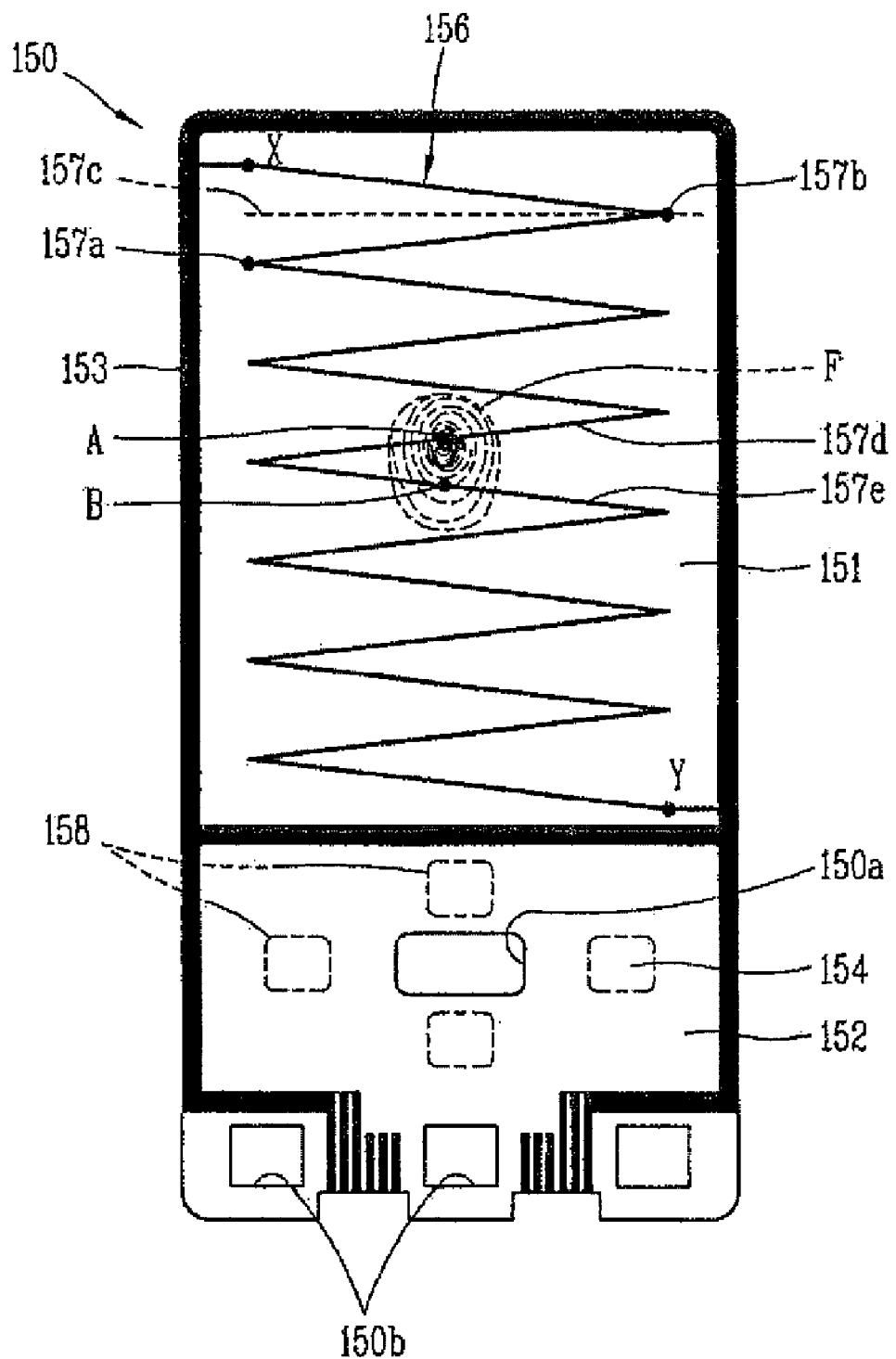
FIG. 4 is a plan view of a touch sheet according to a first embodiment of the present invention.
Figure 5:
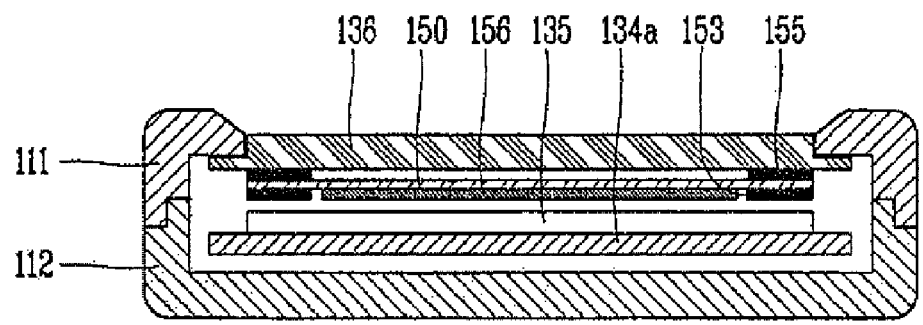
FIG. 5 is a sectional view of the mobile terminal taken along line V-V in FIG. 3.

Next, FIG. 4 is a plan view of the touch sheet 150 according to a first embodiment of the present invention, in which the touch sheet 150 is viewed in a forward direction from the rear surface of the first body 110. In addition, FIG. 5 is a sectional view of the mobile terminal 100 taken along line V-V in FIG. 3, in which the touch sheet 150 and its relevant elements are shown.

As shown in FIG. 4, the touch sheet 150 includes a first region 151 for forming the touch screen part 113 and a second region 152 extending from the first region 151 to form the touch keypad part 114. In addition, a conductive pattern 156 for sensing a touch is formed at the first and second regions 151 and 152, and can be formed by patterning a conductive material, e.g., ITO (Indium Tin Oxide), on the touch sheet 150.

Further, the conductive pattern 156 may be formed as a single layer on one surface of the touch sheet 150 in zigzags. As shown in FIG. 5, in the present exemplary embodiment, the conductive pattern 156 is formed at an inner side of the touch sheet 150. However, the conductive pattern 156 may also be formed at an outer side of the touch sheet 150.

Also, as shown in FIG. 4, the conductive pattern 156 of the first region 151 has a zigzag form in a lengthwise direction of the first body 110, namely, in the direction from the audio output unit 115 to the first manipulation unit 117. The conductive pattern 156 also includes bent points 157a and 157b that are formed at the left and right sides of the conductive pattern 156 in zigzags, at which the direction of the pattern changes. Further, two lines adjacent to the bent point 157b are symmetrical based on a horizontal line 157c (virtual line) that passes through the bent point 152b.

Thus, when the user's finger comes in contact with the window 136, the user's finger is positioned on the region where the conductive pattern 156 is formed on the touch sheet 150. In the following description, the positioning of the user's finger on the region where the conductive pattern 156 is formed will be referred to as 'contacting' the conductive pattern 156 for the sake of explanation.

In addition, as shown in FIG. 4, the conductive pattern 156 is configured such that the user's finger (F) comes into contact with at least two lines 157d and 157e. For this purpose, a maximum distance between the two lines 157d and 157e is set to be shorter than the size of the user's finger (F). Further, both ends (X, Y) of the conductive pattern 151 are connected with a data line 153 disposed at an edge of the touch sheet 150. In more detail, the data line 153 transfers a touch signal inputted to the conductive pattern 156 to the interior of the first body 110, for which an end of the data line 153 is connected to the PCB 134 by the FPCB 141.

Further, conductive patterns 158 of the second region 152 implement a key input unit for inputting information by touching a pre-set region. Also, touch key parts 154 are formed to be spaced apart at the second region 152. In the present exemplary embodiment, the touch key parts 154 are disposed to be spaced apart up/down and left/right centering around the through hole 150a. The mounting holes 150b are also illustrated in FIG. 4.

An operation of the conductive pattern 156 formed at the first region 151 of the touch sheet 150 will now be described in more detail. As shown in FIG. 4, as the user touches the window 136, the user's finger (F) comes into contact with the at least two lines 157d and 157e of the conductive pattern 156. Therefore, current supplied within the terminal flows along the line of the conductive pattern 156, and as the user's finger (F) comes into contact with the conductive pattern 156, a resistance value of the conductive pattern 156 changes.

In addition, as the user's finger (F) contacts the two lines 157d and 157e of the conductive pattern 156, two contact points A and B are generated, and as the positions of the contact points A and B change, the distance between one end (X) of the conductive pattern 156 and one contact point (A) and the distance between the other end of the conductive pattern 156 and the other contact point (B) also change. Accordingly, the change value of the resistance varies depending on the positions of the contact points A and B.

Further, an amount of charge measured at both ends (X, Y) of the conductive pattern 156 changes at every touched point according to the change in the resistance value, and the values measured at both ends (X, Y) of the conductive pattern 156 are compared with set values previously measured at each touch region to detect the touched position. As discussed above, FIG. 5 is a sectional view of the mobile terminal 100 taken along line V-V in FIG. 3, in which the touch sheet 150 and its relevant elements are shown.

Figure 6:
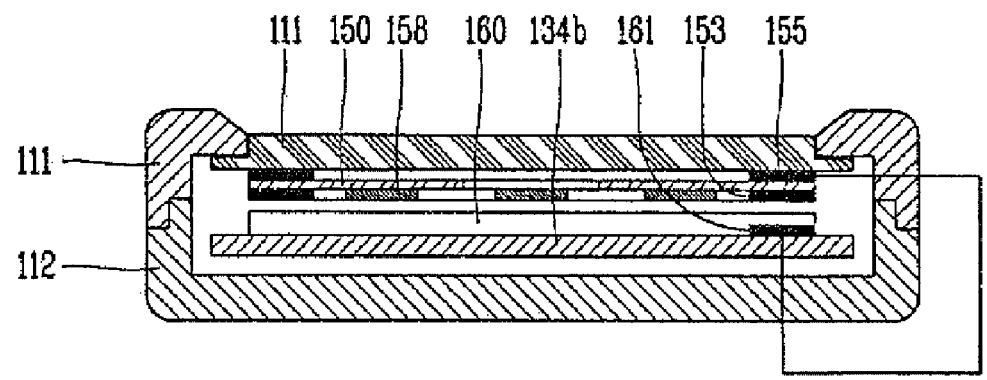
FIG. 6 is a sectional view of the mobile terminal taken along line VI-VI in FIG. 3.

Next, FIG. 6 is a sectional view of the mobile terminal 100 taken along line VI-VI in FIG. 3. With reference to FIGS. 3 and 6, the illumination sheet 160 is disposed at an inner side of the second region 152, and is configured to display an illumination pattern at the touch keypad part 114. In addition, the shielding pattern 155 is formed at edges of the touch sheet 150, and minimizes an external influence, namely, an influence of electromagnetic waves generated from electronic components on signals of the conductive pattern (e.g., signals transferred via the data line 153).

Further, the shielding pattern 155 may be formed by depositing a conductive material, e.g., a metallic material, on the touch sheet 150. The shielding pattern 155 is also formed at a position corresponding to the data line 153, and is formed at an opposite side of the surface on which the data line 153 is positioned. In the present exemplary embodiment, the data line 153 is formed at an inner side of the touch sheet 150, and the shielding pattern 155 is formed at an outer side of the touch sheet 150.

However, conversely, the data line 153 may be formed at the outer side of the touch sheet 150 while the shielding pattern 155 may be formed at the inner side of the touch sheet 150. In addition, the conductive patterns 156 and 158 may be formed on the same surface on which the data line 153 is positioned. Further, a ground 161 is formed at the illumination sheet 160, and the shielding pattern 155 is electrically short-circuited with the ground 161.

In addition, the ground 161 of the illumination sheet 160 and the shielding pattern 155 can be connected in various manners, for example, by a cable or through contact point connection. Therefore, by electrically short-circuiting the shielding pattern 155 and the ground 161 of the illumination sheet 160, an influence of a voltage generated from the illumination sheet 160 on an operation of the touch sheet 150 can be minimized.

FIGS. 7A to 7D are front views of illumination sheets in FIG. 3, in which the operations of the illumination sheet 160 when the touch keypad part 114 is touched are shown in the order of time. As shown, the illumination sheet 160 includes illumination patterns 162 individualized to separately illuminate the touch key parts 154 when the touch keypad part 114 is touched. Further, the illumination pattern 162 is illuminated when a touch is applied to one of the touch key parts 154 to thus allow a user to recognize that the touch has been inputted to the touch key part 154.

In addition, the illumination patterns 162 are positioned at regions corresponding to the touch key parts 154, and in the embodiment shown in FIGS. 7A to 7D, each illumination pattern 162 has concentric circles each having a different radius. In the following description, the illumination patterns 162 disposed at the right portion of the illumination sheet 160 will be taken as an example. Further, the circles indicated by solid lines indicate an illuminated state, and the circles indicated by dotted lines indicate a non-illuminated state.

Further, as shown in FIGS. 7A-7D, the illumination patterns 162 include first to fourth illumination patterns 162a to 162d having different radiuses, and in which the illumination patterns 162a to 162d are sequentially arranged according to their radius. In addition, each of the illumination patterns 162a to 162d may be made of a material having a brightness that can be controlled according to strength of a current, and may be individually controlled to have a brightness that changes in turn along an ambient direction in the order of time. In FIGS. 7A to 7D, the darker solid lines with a greater thickness compared to the other illumination patterns 162 indicate illumination patterns with the highest brightness.

Figure 7A:
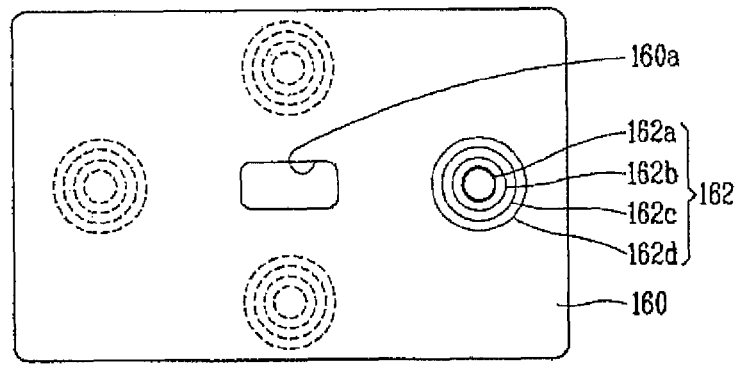
FIGS. 7A to 7D are front views of illumination sheets in FIG. 3.
Figure 7B:
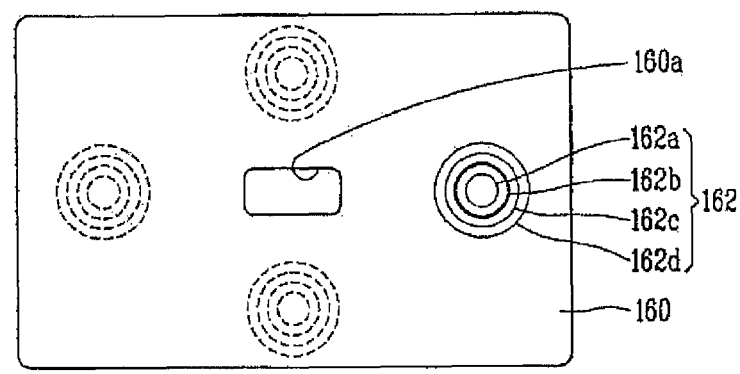

Further, the illumination patterns 162 may be configured such that the first to fourth illumination patterns 162a to 162d are in the state of being brightest in turn over time. For example, as shown in FIG. 7A, when a touch is input to the touch key parts 154 of the touch sheet 150, the first illumination pattern 162a is controlled to be the brightest, and when time passes by, and as shown in FIG. 7B, the first illumination pattern 162a becomes dark while the second illumination pattern 162 is controlled to be the brightest.

Figure 7C:
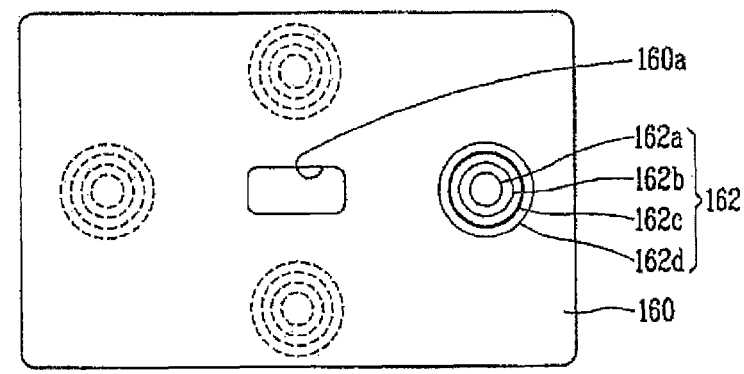
Figure 7D:
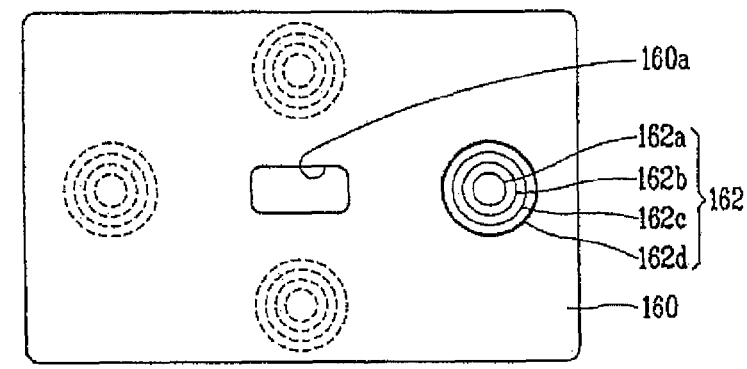

Similarly, as shown in FIG. 7C, as time passes by, the third illumination pattern 162c becomes the brightest, and then, as shown in 7D, after the fourth illumination pattern 162d becomes the brightest, the illuminations of the first to fourth illumination patterns 162a to 162d are stopped. Therefore, when the user inputs a touch to the touch keypad part 114, the illumination patterns 162 of the corresponding touch keypad part 114 are illuminated, and at this time, visual effects are implemented such that light is diffused in a ring shape along the ambient direction.

In addition, the illumination patterns 162 may be individually controlled to be brightest starting from the fourth illumination pattern 162d to the first illumination pattern 162a in turn, whereby light in the ring form can be diffused along the inward direction over time. Further, in the above embodiments, four illumination patterns 162a to 162d are sequentially arranged, but the number of illumination patterns may vary as necessary.

Figure 8A:
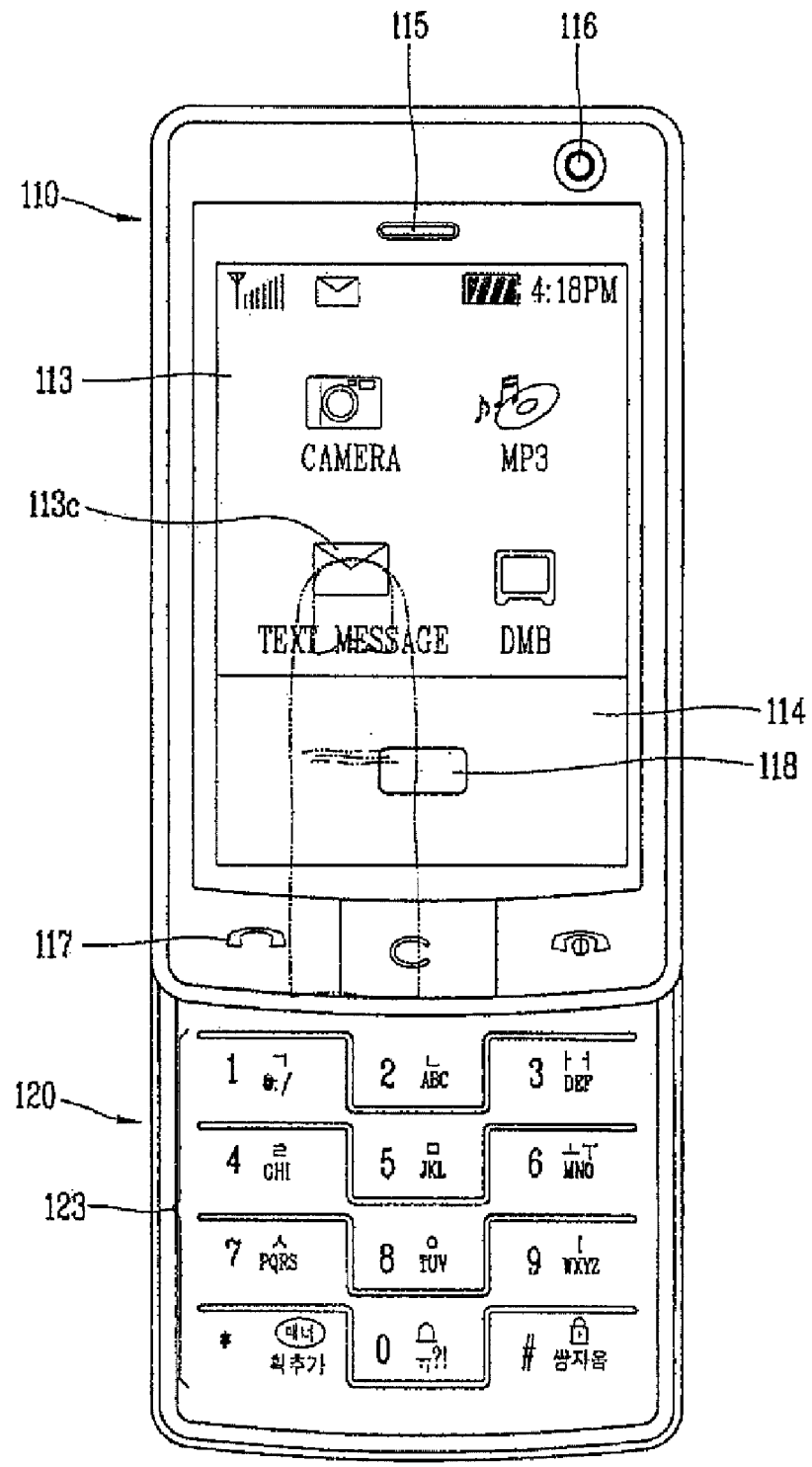
FIGS. 8A to 8C are plan views of the mobile terminal for explaining operations of the mobile terminal according to an embodiment of the present invention.
Figure 8B:
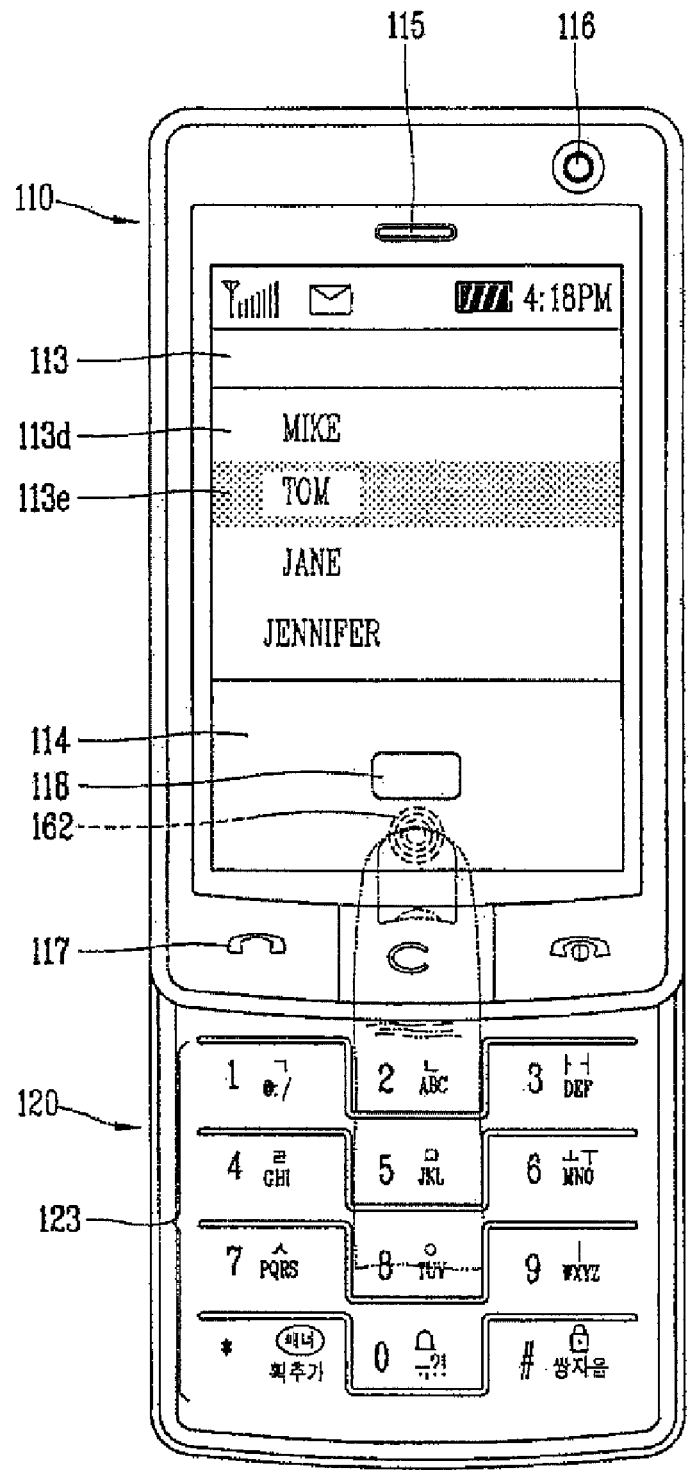
Figure 8C:
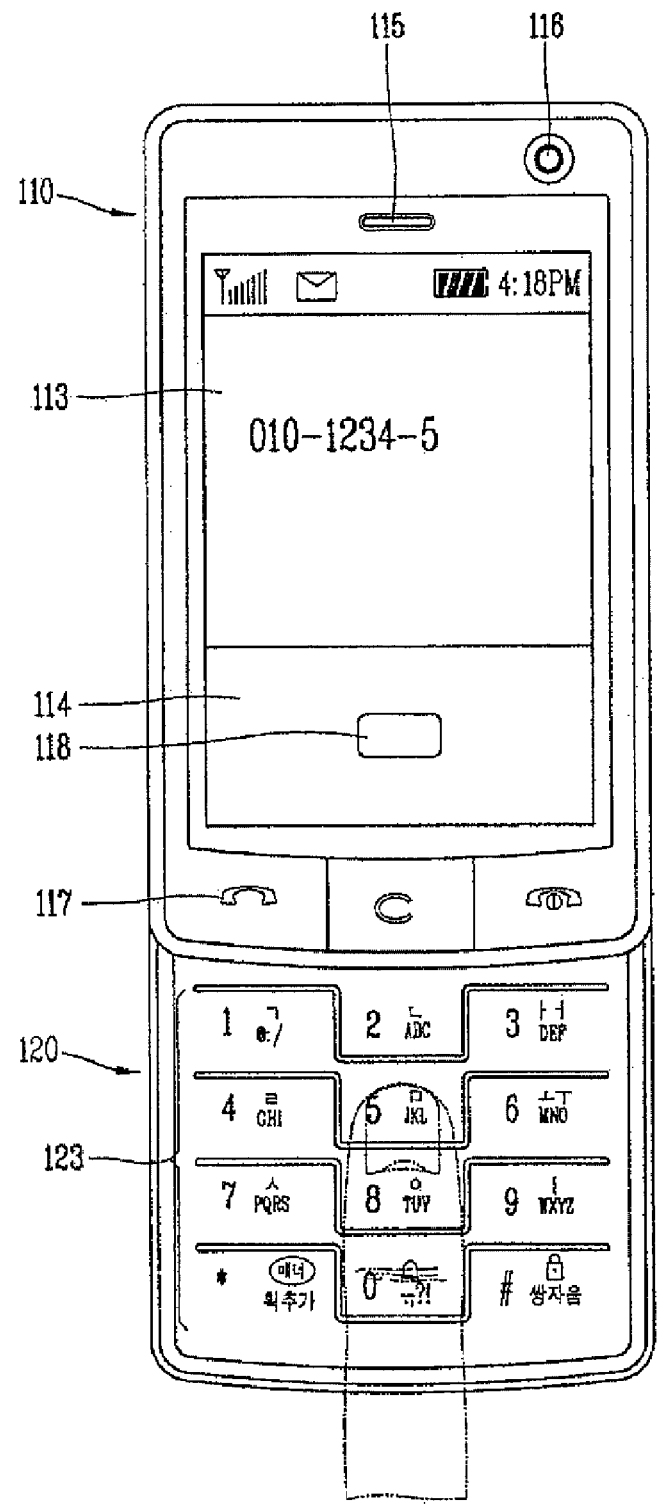

Next, FIGS. 8A to 8C are plan views of the mobile terminal used to explain operations of the mobile terminal according to an embodiment of the present invention. As shown in FIG. 8A, the touch screen part 130 includes a menu or an icon 113c for operating various functions of the mobile terminal 100. Here, when the user touches the part of the menu or the icon 113c (e.g., a text message), the corresponding function is performed.

As shown in FIG. 8B, the touch screen part 113 also includes a list 113d that can be selected, and a cursor or a pointer 113e positioned on the list 113d. Here, the touch keypad part 114 may be implemented in the form of a direction key that can move the cursor or the pointer positioned on the list 113d. In this instance, when the touch keypad part 114 is touched, the illumination pattern of the illumination sheet is displayed on the touch keypad part 114 to allow the user to recognize the touch keypad part 114 has been touched.

Further, in FIG. 8B, the list 113d is a phone book list, and in this instance, by touching the region corresponding to the touch key part 154 positioned at the lower portion (FIG. 4 illustrates the touch key part 154), the cursor or the pointer 113c may be moved downwardly, and then, by pressing the center key 118 positioned at the central region, information (e.g., a phone number) desired to be obtained by the user can be displayed on the touch screen part 113. Further, as shown in FIG. 8B, when the user touches the lower portion of the touch key part 154 to scroll down the phone book list, the illumination patterns 162 are illuminated based on the amount of time the user touches the touch key part 154.

As shown in FIG. 8C, the user may input characters, numbers, symbols, etc., to the terminal by manipulating the second and third manipulating units 123 and 124 and manipulating the touch key part 154. The user can also select a phone number, for example, by touching the phone icon on the first manipulating unit 117. Thus, as shown in the embodiments in FIGS. 8A-8C, the user can easily input and select different options on the terminal and see that the appropriate regions have been touched.

Further, the menu or the icons displayed in the touch screen part 113 may be displayed with a size corresponding to the user's finger or a larger size for the user's convenient touch input. In addition, the conductive pattern 156 of the touch sheet 150 (see FIG. 4) according to embodiments of the present invention is suitable for sensing the touch inputted to the recognition region formed with such a size as described above.

Figure 9:
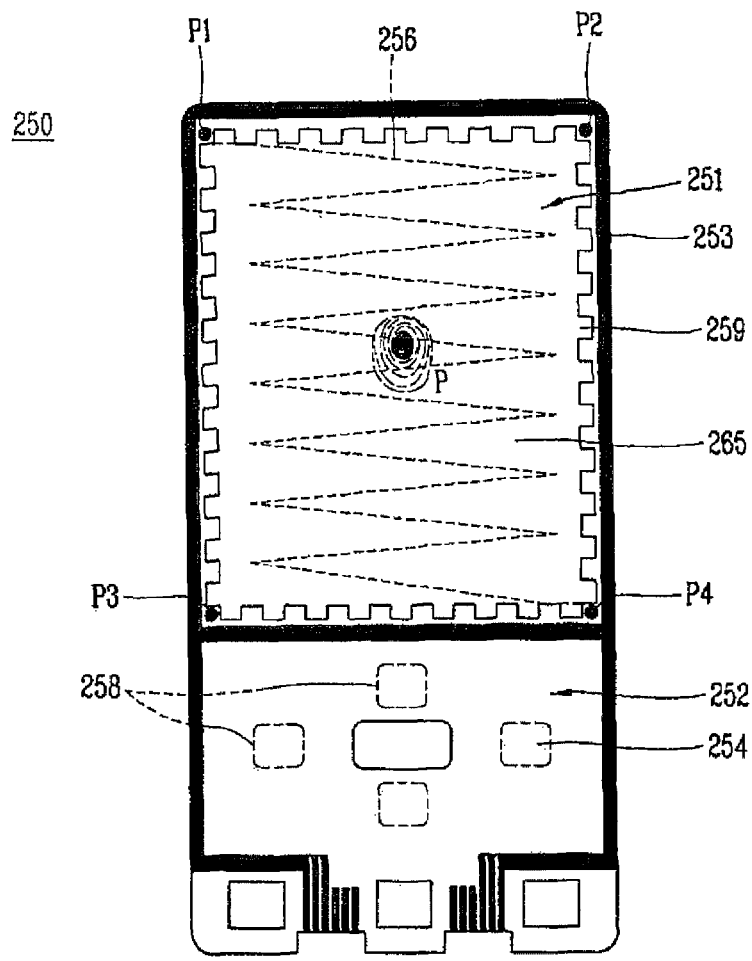
FIG. 9 is a plan view of a touch sheet according to a second embodiment of the present invention.
Figure 10:
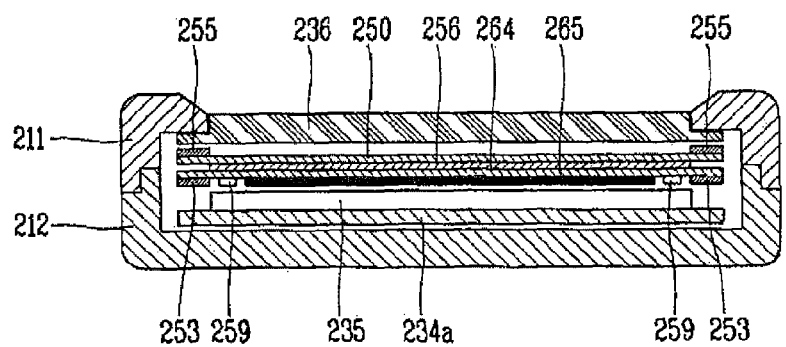
FIG. 10 is a sectional view of the mobile terminal with the touch sheet in FIG. 9 mounted on a first body.

Next, FIG. 9 is a plan view of a touch sheet 250 according to a second embodiment of the present invention, and. FIG. 10 is a sectional view of the mobile terminal with the touch sheet in FIG. 9 mounted on a first body. In addition, in FIG. 10, the touch sheet 250 and its relevant elements are exaggerated for illustration purposes.

As shown, the touch sheet 250 includes a first region 251 and a second region 252 that extends from the first region. Conductive patterns 256 and 258 formed at the first and second regions 251 and 252. FIGS. 9 and 10 also illustrate a data line 253, touch key part 254, front case 211, rear case 212, display module 235, PCB 234a, window 236, etc. that correspond with similar components shown in the other above-described figures (except the reference numerals have been increased by 100).

FIG. 10 also illustrates an insulation layer 265 provided on an inner surface of the conductive pattern 256 formed at the touch sheet 250, and a conductive layer 264 formed on an inner surface of the insulation layer 265 by vacuum-depositing (e.g., sputtering) a transparent conductive material. As shown, the conductive layer 264 formed at the first region 251, and the data line 253 is disposed on edges of the conductive layer 264 and electrically connected with the conductive layer 264. Here, the data line 253 surrounds the edges of the first and second regions 251 and 252 and may be also electrically connected with the conductive patterns 256 and 258 of the first and second regions 251 and 252.

Further, a shielding pattern 255 is formed at edges of the touch sheet 250 in order to minimize an external influence, namely, an influence of electromagnetic waves generated from the electronic components on signals transferred through the data line 2532. In addition, as shown in FIG. 9, electric field generating portions P1 to P4 for generating an electric field at the conductive layer 264 are disposed at edges of the conductive layer 264. The electric field generating parts P1 to P4 may also be disposed at portions corresponding to vertexes of the rectangular first region 251 and electrically connected with the data line 253.

Further, a correction pattern 259 for linearly correcting the electric field generated at the conductive layer 264 is formed at the edges of the conductive layer 264, namely, between the conductive layer 264 and the data line 253. Also, the correction pattern 259 is configured such that a conductive material forms a particular pattern. Therefore, the form of electric field according to interaction between the current flowing through the correction pattern 259 and the electric field generated at the conductive layer 264 is corrected to correspond to the rectangular shape of the first region 251.

Figure 11:
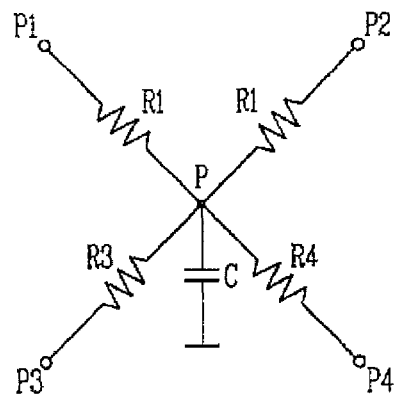
FIG. 11 is a circuit diagram showing a schematically converted electrical field form on a conductive layer when the touch sheet in FIG. 9 is touched.

In addition, the electric field generating parts P1 to P4 generate electric field above the conductive layer 264, and FIG. 11 shows a schematic circuit diagram when a point (P) of the first region 251 shown in FIG. 9 is touched. With reference to FIG. 11, the electric field formed at the conductive layer 264 may be simply replaced by the circuit diagram having one capacitor (C) and four resisters R1 to R4 based on the touched point (P).

As the touched point (P) changes, the values of the resisters R1 to R4 vary, and accordingly, the amount of charge (C) accumulated at the touched point (P) varies. Further, the variation value of the amount of charge (C) is measured and compared with pre-set previously measured values. Therefore, because the mobile terminal according to the present embodiment further includes the touch sensing method using the conductive layer 264 and the electric field generating parts (P1 to P4) in addition to the touch sensing by virtue of the conductive pattern 256, the precision and accuracy of the touch sensing is improved without affecting the thickness of the touch sheet 250.

Figure 12:
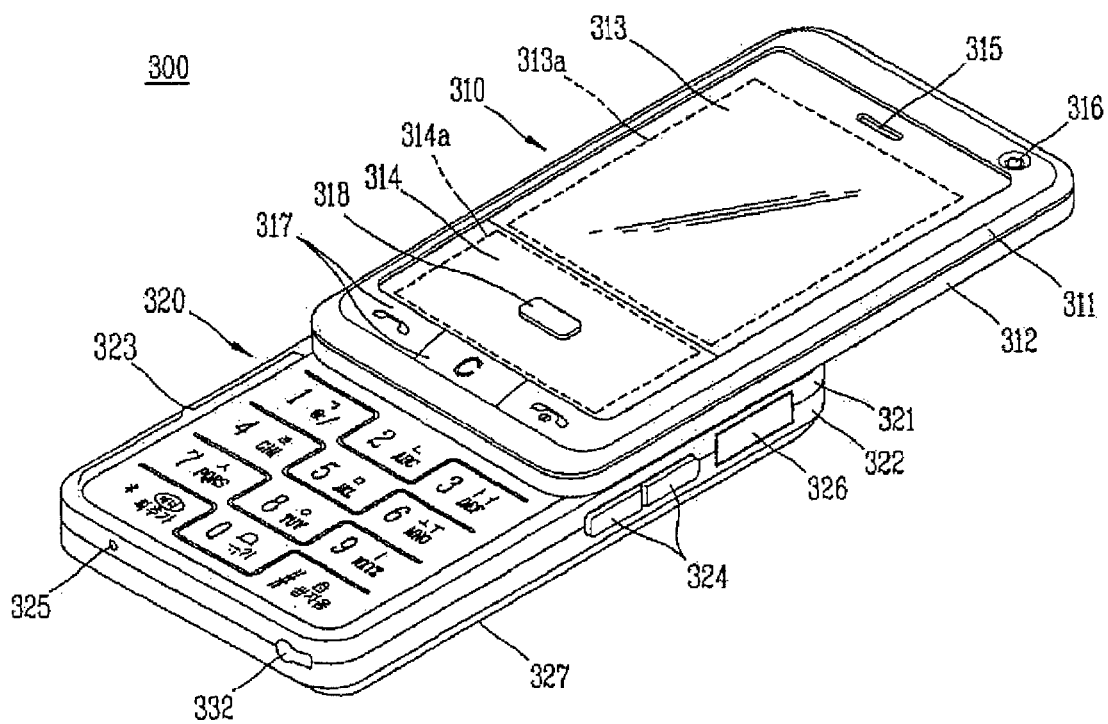
FIG. 12 is a perspective view of a mobile terminal according to another embodiment of the present invention.
Figure 13:
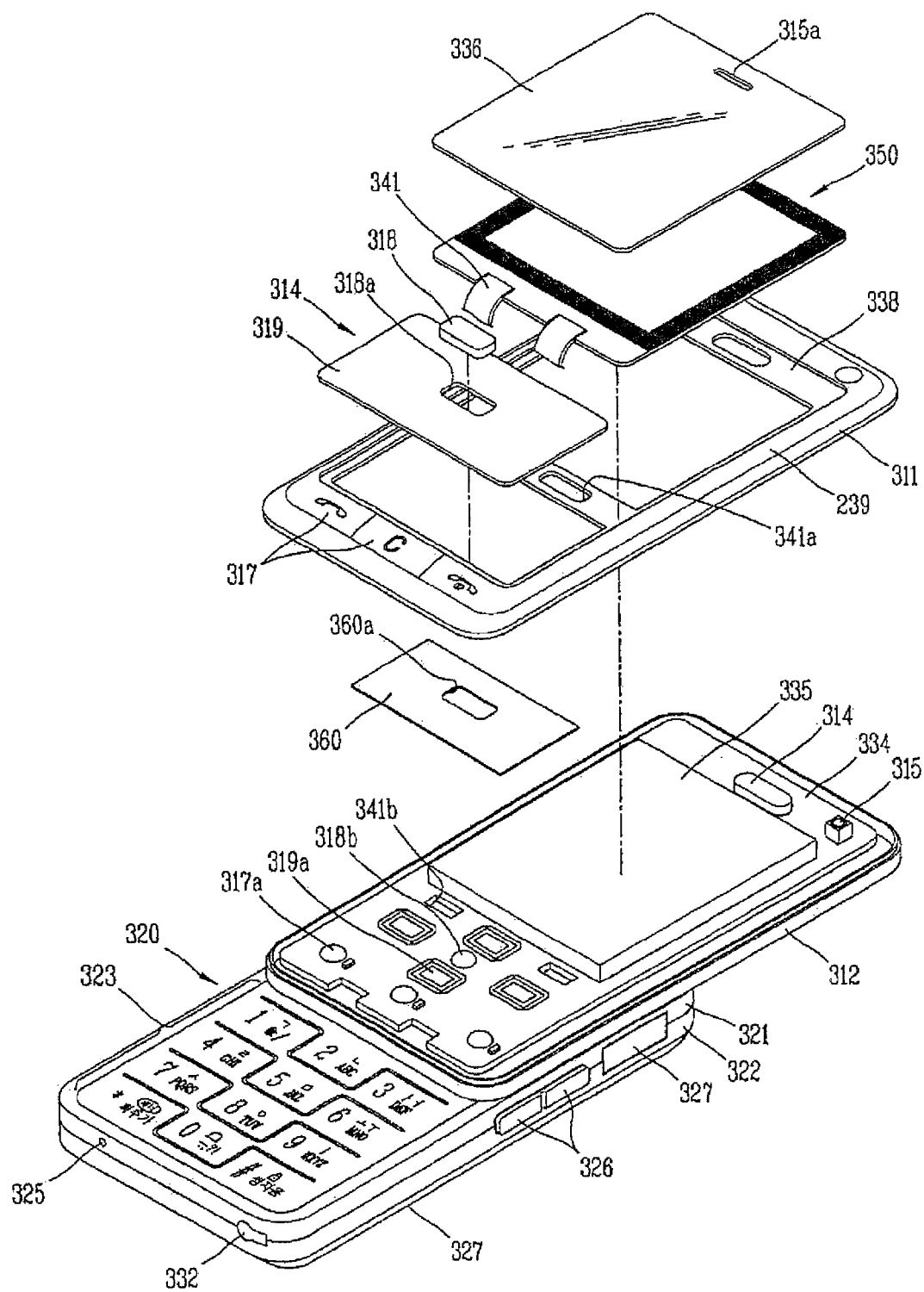
FIG. 13 is an exploded perspective view of the mobile terminal in FIG. 12.

Next, FIG. 12 is a perspective view of a mobile terminal according to another embodiment of the present invention, and FIG. 13 is an exploded perspective view of the mobile terminal in FIG. 12. Reference numerals shown in FIG. 12 are similar to the reference numerals shown in FIG. 1, but are increased by 200 from the reference numerals shown in FIG. 1.

As shown in FIG. 12, the mobile terminal includes a first region 313a and a second region 314a formed on a front surface of a first body 310. A touch screen part 313 and a touch keypad part 314 are disposed on the first and second regions 313a and 314a, respectively. Further, a window 336 made of a transmissive material is mounted on a front side of the first region 313a, and a touch sheet 350 for sensing a touch is mounted at an inner side of the window 336. Thus, when a touch is input to the window 336, the touch sheet 350 senses the touch and transfers a touch signal to the interior of the terminal body.

In addition, the conductive patterns formed on the touch sheet 350 (see FIG. 13) to sense a touch can be formed in the same or similar manner as for the conductive patterns 156 and 256 in the former embodiments. In addition, in the present exemplary embodiment, the insulating layer and the electric field generating parts P1 to P4 may be disposed on the touch sheet 350 in a similar manner as in FIGS. 9 and 10.

Further, in FIG. 13, a touch panel 319 is mounted on the front face of the second region 314a, and is formed in a plate shape. In addition, touch sensors 319a that sense a touch are mounted at an inner side of the touch panel 319. The touch sensors 319a are separately mounted at appropriate positions on a PCB 336. Thus, when a region corresponding to the touch sensors 319a of the touch panel is touched, the touch sensors 319a sense the touch and transfer a touch signal to the PCB 336.

Further, a through hole 318a is formed at a central portion of the touch panel 319, and a center key 318 that can be pressed is mounted in the through hole 318a. A switch 318b that inputs information according to a pressing operation of the center key 318 is also mounted at an inner side of the center key 318. In addition, an illumination sheet 360 that displays an illumination pattern on the touch panel 319 is mounted at an inner side of the touch panel 319, and the configuration and operation of the illumination sheet 360 is the same as that in the former embodiments, so its description will be omitted. Other reference numerals shown in FIG. 13 that have not been described correspond to similar reference numerals shown in FIG. 3

Further, the above embodiments describe a slide type mobile terminal, but the present invention is applicable to all types of mobile terminals such as a bar type mobile terminal, a folder type mobile terminal, a swing type mobile terminal, a swivel type mobile terminal, and the like.

Figure 14:
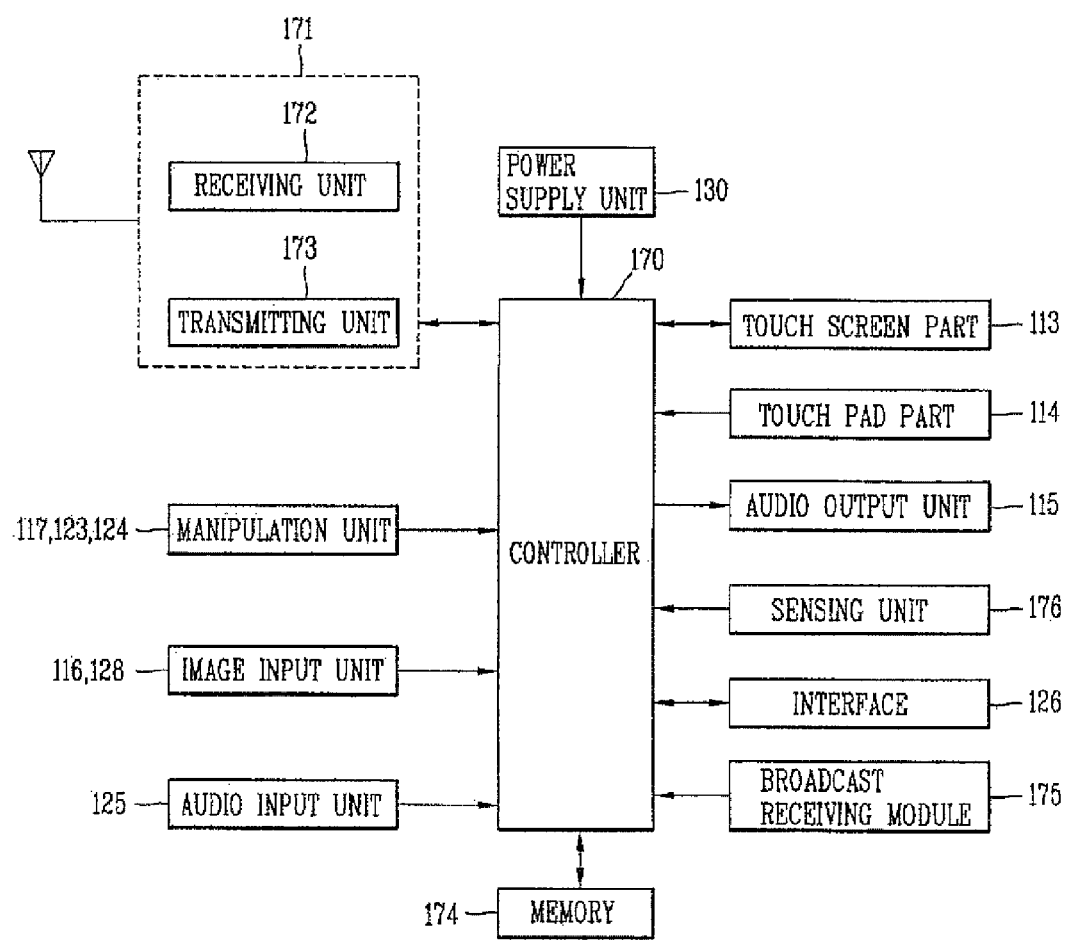
FIG. 14 is a schematic block diagram of the mobile terminal according to an embodiment of the present invention.

Next, FIG. 14 is a schematic block diagram of a mobile terminal according to an embodiment of the present invention. In the following description, the mobile terminal 100 in FIG. 1 will be explained, but it can be also applicable to the mobile terminal 300 shown in FIG. 12.

As shown in FIG. 14, the mobile terminal includes a wireless communication module 171, the manipulation units 117, 123 and 124, the image input units 116 and 128, the audio input unit 125, the touch screen part 113, the touch keypad part 114, the audio output unit 115, a sensing unit 176, the interface 126, a broadcast receiving module 175, a memory 174, a power supply unit 130, and a controller 170.

The controller 170 controls the overall operations of the mobile terminal. For example, the controller 180 performs the controlling and processing associated with voice calls, data communications, video calls, and the like. The controller 170 also receives a touch signal inputted to the touch screen part 113 and the touch keypad part 114 and controls other electronic components to operate relevant operations of the mobile terminal.

In addition, the wireless communication module 171 transmits/receives radio signals to/from a network (e.g., mobile communication base station) via an antenna. Further, the wireless communication module 171 includes a transmitting unit 172 that handles the transmission and reception of audio data, text data, image data and control data, modulates transmission signals and transmits the modulated signal, and a receiving unit 173 that demodulates received signals under the control of the controller 170.

The manipulation units 117, 123 and 124 are configured as shown in the above-described embodiments and provide key input data input by the user to control operations of the terminal to the controller 170. The image input units 116 and 128 process image frames such as still images or video acquired by an image sensor or the like in a video call mode or an image capturing mode. The processed image frames are converted into image data that can be displayed or output on the touch screen part 113.

Further, the image frames processed by the image input units 116 and 128 may be stored in the memory 174 or transmitted externally through the wireless communication module 171 under the control of the controller 170. The audio input unit 125 receives external audio signals via a microphone in a phone call mode, a recording mode or a voice recognition mode, etc., and processes the received audio signals into electrical voice data.

In addition, in the phone call mode, the processed voice data is converted into a form that can be transmitted to the network (e.g., mobile communication base station) via the wireless communication module 171. In the recording mode, the processed voice data is output and stored in the memory 174. Further, the audio input unit 125 may include various types of noise canceling or suppression algorithms to cancel or suppress noise generated in the course of receiving and transmitting audio signals.

Also, the touch screen part 113 outputs information processed in the mobile terminal. For example, when the mobile terminal 100 is in the phone call mode, the touch screen part 113 may display a User Interface (UI) or a Graphic User Interface (GUI) associated with a call or other communication mode under the control of the controller 170. When the mobile terminal 100 is in the video call mode or the image capturing mode, the touch screen part 113 may display a captured image and/or received image, a UI, a GUI, and the like, under the control of the controller 170.

Further, the touch screen part 113 may be used as an input device that inputs information in a tactile manner. The audio output unit 115 converts audio data received from the wireless communication module 171 or stored in the memory 174 and outputs the converted data in a call signal reception mode, a phone call mode, a recording mode, a voice recognition mode, and the like, under the control of the controller 170.

Also, the audio output module 115 provides audible outputs related to a particular function (e.g., a call signal reception sound, a message reception sound, etc.) performed by the mobile terminal. In addition, the sensing unit 176 detects a current status (or state) of the mobile terminal 100 such as an open/close state of the mobile terminal 100, a location of the mobile terminal 100, presence or absence of user contact with the mobile terminal, etc., and generates a sense or control signal for controlling the operation of the mobile terminal.

For example, when the mobile terminal is a slide type mobile phone, the sensing unit 176 senses whether the slide phone is opened or closed and outputs the sensing result to the controller 170 to thereby control the operations of the terminal 100. In addition, the sensing unit 176 can detect whether or not the power supply unit 130 supplies power to the terminal and whether or not the external interface 126 is coupled with an external device.

Additionally, when a touch is input to the touch screen part 113 or the touch key pad part 114, the sensing unit 176 senses the touch and applies a touch signal to the controller 170. When a touch is input to the conductive patterns (156 and 158 in FIG. 4) of the touch sheet 150, the sensing unit 176 senses a change in an amount of charge generated from the conductive patterns 156 and 158 and transfers the same to the controller 170.

Further, when the user touches the menu or the icon (e.g., the icon 113c in FIG. 8A displayed on the touch screen part 113), the sensing unit 176 senses the touch and applies a corresponding signal to the controller 170. Then, the controller 170 operates a corresponding function of the menu or the icon 113c. In addition, when the user touches the touch keypad part 114, the sensing unit 176 senses the user's touch and applies a signal to the controller 170.

When the touch keypad part 114 is implemented as a direction key, the controller 170 applies a signal for moving the cursor 113e in the list (e.g., the list 113d in FIG. 8B) displayed on the touch screen part 113, and at the same time, applies a signal for illuminating the illumination patterns 162 in FIGS. 7A to 7dD to the illumination sheet 160. As discussed above, the controller 170 individually controls the illumination patterns 162a to 162d such that brightness of the illumination patterns 162a to 162d in the concentric circles changes in the order of time.

In addition, the interface 126 serves as an interface for at least one external device connected with the mobile terminal. For example, the external device may include a wired/wireless headset, an external power charger, a wired/wireless data port, a card socket (e.g., for receiving a memory card, a Subscriber Identity Module/User Identity Module (SIM/UIM) card, etc.), and the like. The interface 126 may also be used to receive inputs (e.g., data, information, power, etc.) from an external device and transfer the received inputs to one or more elements within the mobile terminal, or may be used to transfer data from the mobile terminal to another external device.

Further, the memory 174 stores programs or the like used for the processing and controlling operations performed by the controller 170, or may temporarily store inputted/outputted data (e.g., a phonebook, messages, still images, video, etc.). Also, the memory 174 stores a program that controls the overall operations of the mobile terminal 100 according to embodiments of the present invention. The memory 174 may also include at least one type of storage medium including a hard disk type, a card-type memory (e.g., SD or XD memory, etc), a flash memory, a Random Access Memory (RAM), a Read-Only Memory (ROM), and the like.

In addition, the broadcast receiving module 175 receives a broadcast signal transmitted through a satellite or terrestrial service, convert the same into a broadcast data format that can be output to the touch screen part 113 and the audio output unit 115 and outputs the converted data to the controller 170. Further, the broadcast receiving module 175 also receives supplementary data associated to a broadcast (e.g., Electronic Program Guide (EPG), a channel list, etc.).

The broadcast data and supplementary data is then converted by the broadcast receiving module 175 and may be stored in the memory 174. In addition, the power supply unit 130 is provided with an internal or external power source and supplies power used for operating the different elements of the terminal under the control of the controller 170.

As so far described, the mobile terminal according to embodiments of the present invention has several advantages. That is, first, because the touch screen part and the touch pad part are provided to the first and second regions, respectively, formed on the front surface of the terminal body, a convenient user interface environment is provided and the design of the mobile terminal is simplified.

Second, the illumination sheet including the illumination patterns for individually illuminating the touch key parts allows the user to effectively recognize a touch input, and because the illumination patterns in the concentric circles are individually controlled such that their brightness changes in the order of time, the user can easily see the operations of the touch parts.

Third, because the conductive pattern of the touch sheet is formed as a single layer, the touch sheet may be formed to be thinner and have an improved light transmittance. Also, because a conductive material is used for the conductive pattern, the overall material costs of the terminal can be reduced.

Fourth, because the touch sensing method using a single layer, the touch sensing method using the conductive layer formed through vacuum deposition and the electric field generating unit are applied in conjunction, and the accuracy of touch sensing is improved without significantly affecting the thickness of the touch sheet.

Fifth, because the input method uses the touch screen and the touch pad, a more convenient user interface is provided.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
a terminal body;
a window formed of a transmissive material, mounted on the terminal body and having first and second regions;
a display module disposed under the first region and configured to display visual information;
a through hole formed in the second region of the window;
a first input unit of a push type extending through the through hole and configured to be pressed, a size and shape of the first input unit corresponding to a size and shape of the through hole; and
a second input unit of a touch type disposed under the window and at both sides of the first input unit within the second region and configured to sense a touch input.

2. The mobile terminal of claim 1, further comprising:
a printed circuit board mounted at an internal space of the terminal body,
wherein the second input unit comprises touch sensors electrically connected with the printed circuit board by a flexible printed circuit board and configured to sense the touch input to the second input unit.

3. The mobile terminal of claim 2, wherein the touch sensors are disposed separately at multiple positions within the second region.

4. The mobile terminal of claim 3, wherein the first input unit is disposed between the touch sensors and the first and second input units are aligned in the widthwise direction of the terminal body.

5. The mobile terminal of claim 1, further comprising:
an illumination part disposed at the second region and configured to illuminate the second input unit.

6. The mobile terminal of claim 5, wherein the illumination part individually illuminates the second input unit.

7. The mobile terminal of claim 5, wherein the illumination part has a plurality of illumination sheets disposed separately at multiple positions within the second region.

8. The mobile terminal of claim 1, further comprising:
a touch sheet configured to sense a touch, and including a first region for forming a touch screen part and a second region extending from the first region for forming a touch keypad part.

9. The mobile terminal of claim 8, wherein the illumination part is configured to be operated when the touch keypad part is touched.

10. The mobile terminal of claim 1, wherein the first and second regions are configured to form a touch screen part and a touch keypad part respectively.

11. The mobile terminal of claim 1, further comprising:
a touch sheet configured to sense a touch on the window,
wherein the touch sheet is electrically connected with a printed circuit board by a flexible printed circuit board.

12. The mobile terminal of claim 1, further comprising a touch sheet attached on an inner side of the window and configured to sense a touch on the first region.

13. The mobile terminal of claim 12, wherein the touch sheet further comprises:
a first conductive pattern formed on the touch sheet;
a conductive layer disposed on one face of the first conductive pattern;
a data line electrically connected to the conductive layer and disposed at edges of the touch sheet; and
electric field generating units disposed at the edges of the touch sheet and configured to generate an electric field at the conductive layer.

14. The mobile terminal of claim 12, wherein a portion of the touch sheet corresponding to the second input unit includes a second conductive pattern configured to sense a touch of the second input unit.

15. The mobile terminal of claim 14, wherein the second conductive patterns are spaced apart from each other on the touch sheet.

16. The mobile terminal of claim 15, further comprising:
an illumination sheet disposed at the second region and configured to illuminate the second input unit,
wherein the touch sheet further comprises a shielding pattern electrically short-circuited to ground of the illumination sheet and configured to block an influence of the illumination sheet.

17. The mobile terminal of claim 16, further comprising:
a data line formed at edges of the touch sheet and configured to transfer a touch signal corresponding to the first and second regions being touched,
wherein the shielding pattern is formed at a position corresponding to the data line and positioned at an opposite surface of a surface of the touch sheet on which the data line is positioned.

18. The mobile terminal of claim 16, wherein the illumination sheet has individualized illumination patterns configured to separately illuminate touched regions of the second input unit, and
wherein the illumination patterns each have a different radius and are formed in concentric circles arranged in sequence along the radius.

19. The mobile terminal of claim 18, further comprising:
a control unit configured to separately control the illumination patterns to have a brightness that changes along an ambient direction based on a length of time a corresponding illumination pattern is touched.

20. The mobile terminal of claim 1, further comprising:
a switch disposed within the terminal body and configured to input information according to a pressing operation of the first input unit.

21. The mobile terminal of claim 1, wherein the terminal body comprises:
a support frame surrounding a circumference of the first and second regions; and
a switch mounted at an inner side of the support frame and configured to input information according to a pressing operation of a manipulation unit included in the support frame.

22. The mobile terminal of claim 1, wherein the terminal body comprises:
a first body; and
a second body connected to be slidably moved with respect to the first body, and
wherein the first body includes the first and second input units disposed on a front surface thereof, and the second body includes a keypad on a front surface thereof and configured to input numbers or characters.

23. A mobile terminal comprising:
a terminal body;
a window formed of a transmissive material, mounted on the terminal body and having first and second regions;
a display module disposed below the first region and configured to display visual information;
a through hole formed in the second region of the window;
a first input unit of a push type disposed at the through hole and configured to be pressed;
a second input unit of a touch type disposed at both sides of the first input unit within the second region and configured to sense a touch input;
a touch sheet configured to sense a touch on the window, and including a first region for forming a touch screen part and a second region extending from the first region to form a touch keypad part;
a support frame surrounding a circumference of the first and second regions; and
a switch mounted at an inner side of the support frame and configured to input information according to a pressing operation of a manipulation unit included in the support frame.

24. A mobile terminal comprising:
a terminal body;
a window formed of a transmissive material, mounted on the terminal body and having first and second regions;
a display module disposed under the first region and configured to display visual information;
a through hole formed in the second region of the window;
a first input unit of a push type extending through the through hole and configured to be pressed, an outer circumferential surface of the first input unit being completely surrounded by the window; and
a second input unit of a touch type disposed under the window and at both sides of the first input unit within the second region and configured to sense a touch input.

25. A mobile terminal comprising:
a terminal body;
a window formed of a transmissive material, mounted on the terminal body and having first and second regions;
a display module disposed under the first region and configured to display visual information;
a through hole formed in the second region of the window;
a first input unit of a push type extending through the through hole and configured to be pressed, an outer circumferential surface of the first input unit being completely surrounded by the second region; and
a second input unit of a touch type disposed under the window and at both sides of the first input unit within the second region and configured to sense a touch input.

26. The mobile terminal of claim 25, further comprising a touch sheet disposed under the window and configured to sense a touch of the second input unit,
wherein the touch sheet is formed to completely surround an outer circumferential surface of the first input unit.

* * * * *

UNITED STATES PATENT AND TRADEMARK OFFICE
CERTIFICATE OF CORRECTION

PATENT NO. : 8,249,661 B2
APPLICATION NO. : 12/172522
DATED : August 21, 2012
INVENTOR(S) : Seong-Cheol Lee et al.

Page 1 of 1

It is certified that error appears in the above-identified patent and that said Letters Patent is hereby corrected as shown below:

ON THE TITLE PAGE:

At item (75), Inventors, correct the identification of the second-named inventor from "Han-Cyu Oh, Seoul (KR)" to --Han-Gyu Oh, Seoul (KR)--.

Signed and Sealed this
Thirteenth Day of November, 2012

David J. Kappos
*Director of the United States Patent and Trademark Office*